(12) United States Patent
Hightower et al.

(10) Patent No.: US 6,416,412 B1
(45) Date of Patent: Jul. 9, 2002

(54) SYSTEM FOR REMOTELY ACTIVATING A SOUND IN A GAME UNIT

(75) Inventors: Aaron Michael Hightower, Fremont; John Ray, San Jose; Stephen R. Riesenberger, Morgan Hill, all of CA (US)

(73) Assignee: Atari Games Corporation, Milpitas, CA (US)

( * ) Notice: Subject to any disclaimer, the term of this patent is extended or adjusted under 35 U.S.C. 154(b) by 0 days.

(21) Appl. No.: 09/268,898

(22) Filed: Mar. 16, 1999

(51) Int. Cl.[7] .................................................. A63F 13/00

(52) U.S. Cl. ................................ 463/41; 463/40; 463/6

(58) Field of Search ............................... 463/41, 39–42, 463/6, 43, 44, 35, 30, 36, 40

(56) References Cited

U.S. PATENT DOCUMENTS

| | | | | |
|---|---|---|---|---|
| 4,846,686 A | * | 7/1989 | Adams | 434/69 |
| 5,184,956 A | * | 2/1993 | Langlais et al. | 434/69 |
| 5,558,339 A | * | 9/1996 | Perlman | 463/42 |
| 5,618,179 A | * | 4/1997 | Copperman et al. | 434/69 |
| 6,106,399 A | * | 8/2000 | Baker et al. | 463/42 |

\* cited by examiner

*Primary Examiner*—Michael O'Neill
(74) *Attorney, Agent, or Firm*—Knobbe, Martens, Olson & Bear, LLP (57) ABSTRACT

A wide area vehicle driving video game is discussed that includes remote activation of sounds that are communicated to other players across the wide area network. Also discussed is a naming feature that presents the names of players next to the car that they are driving. The name is presented in a font that can be read no matter how far away the car appears in the video game display.

18 Claims, 7 Drawing Sheets

SYSTEM FOR REMOTELY ACTIVATING A SOUND IN A GAME UNIT

BACKGROUND OF THE INVENTION

1. Field of the Invention

The invention pertains to electronic or video games which share information across a network. Aspects of the invention relate to remotely activating sounds on a video game and displaying an identification indicia such as a name next to a player's indicia.

2. Description of the Related Art

Figure 1:
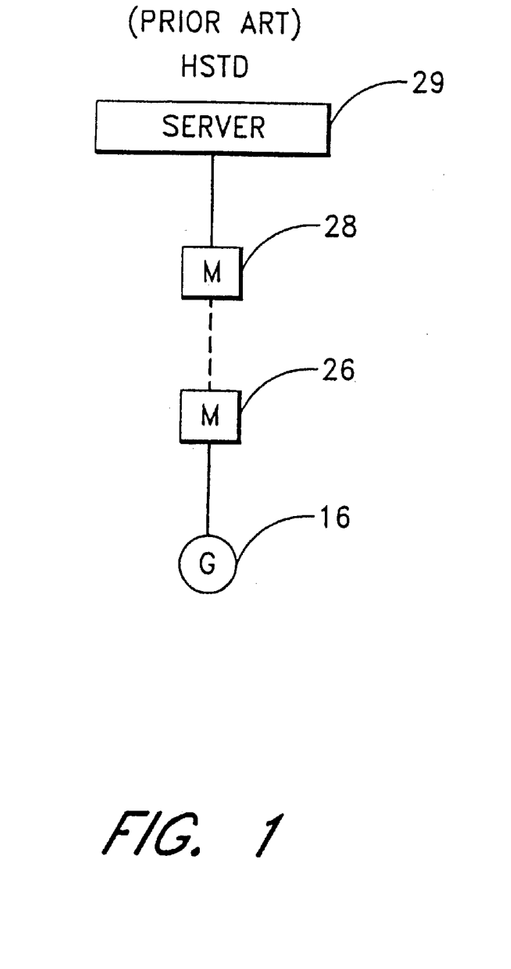
FIG. 1 is a simplified diagram illustrating the operation of a prior art high score to date type of tournament system.

Referring briefly to FIG. 1, there is shown one type of tournament system, referred to as a high score to date system, in which players do not compete interactively with each other. One system of this type is shown in U.S. Pat. No. 5,083,271 to Thacher et al., wherein all players competing in a tournament play their games individually and when finished transmit their scores to a central server. Thus, in this system, each individual game unit 16 is linked via a modem 26 to a cooperating modem 28 of a central server 29. This central server 29 then receives individual scores, one at a time from a number of game units 16 which are sequentially interconnected with its modem 28, for example by polling of the various game unit modems 26 by the server 29 in some preselected sequence. While a given game unit 16 is being polled by the server 29, information may be exchanged between the server and the game unit to indicate to the player scores of other players participating in the tournament who have completed games to date, such that the individual player may compare his score with other scores of games completed to date. Hence, the name usually given to such a system, "high score to date."

Figure 2:
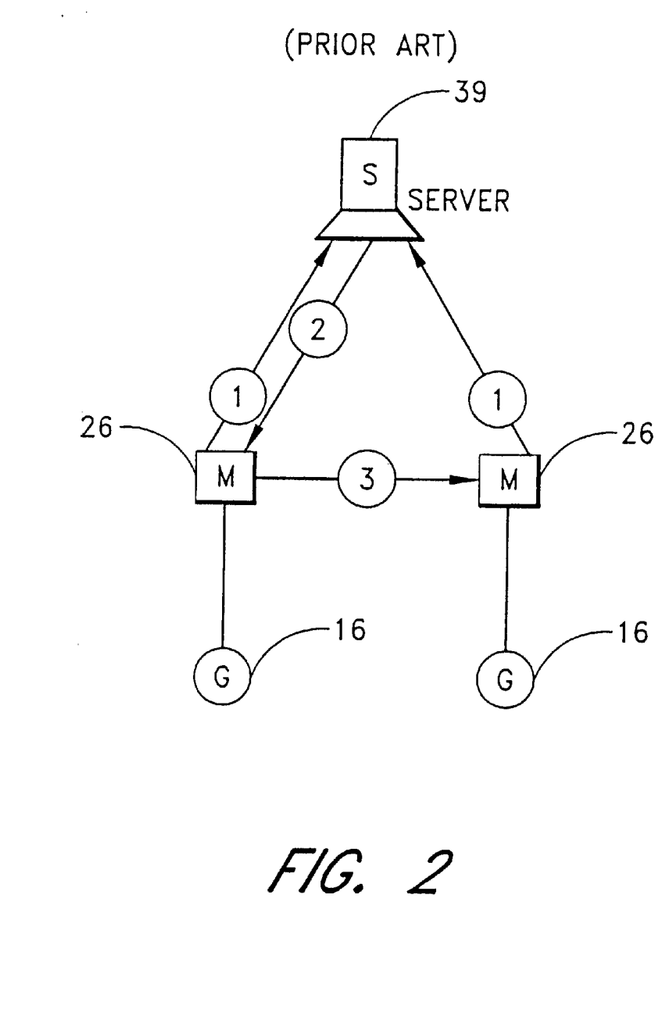
FIG. 2 is a simplified block diagram of the operation of a prior art system for interactive play between only two players in different locations.

FIG. 2 shows another system in which a server 39 facilitates interconnection for interactive play between only two game units 16, each of which has a modem 26. The server 39 may also include a modem (not shown) for communicating with the individual game unit modems 26. The process is a three step process as indicated by arrows 1, 2 and 3 in FIG. 2. In the first step, the two modems 26 from the two game units 16 address the server either simultaneously or sequentially and indicate their availability for linked play. In the second step, the server indicates to the first player making such a request the availability of the second player and transmits the telephone number or the email address of the second player. If interested in engaging the second player, the first player, as indicated in step 3, contacts the second player by using this telephone or email address, and play commences directly between the two players. The server 39 is not involved during the actual play between the two players, but only facilitates the task of initially locating another player.

The systems shown in FIGS. 1 and 2 have a number of limitations. For example, the system of FIG. 2 cannot be used to link more than two players for interactive play, and cannot be utilized to facilitate tournament play as with the system of FIG. 1. On the other hand, the high score to date tournament system of FIG. 1 is not capable of supporting real time interactive play among the various players, but can only compare scores and transmit the resulting scoring information to the individual players.

Other prior art systems had the ability to display player's names to each player within a networked video game unit environment. However, these games had severe limitations that constrained the advantages of the name display. For example, in one system, each player's name was shown on the side of a racing car. Thus, if one player approached another player from the rear, neither player could see the other player's name. It was only when one car turned to the side that the player's name was shown.

In another prior art system, the name of each player was displayed on the rear portion of his car. However, as the car moved forward into the distance and became smaller, the name of the player was reduced accordingly. Thus, once the car was far in the distance, the name of the player could not be read. Thus, a need exists for a system of displaying player's names in an interconnected video game network that does not suffer from the disadvantages of prior systems.

SUMMARY OF INVENTION

A method and system are described for sending information across a video game unit network. The invention includes systems and methods for remotely activating sounds on a game unit, such as an arcade game. The invention also includes systems and methods of displaying a player's name next to his indicia in a video game.

Embodiments of the present invention relate to game units, and game unit networks that transmit sounds from one game unit on the network to other game units on the network. In one embodiment, each game unit is a video game such as a car driving game. In one embodiment, a state table is stored within the car driving game that stores aspects of each player's car.

DETAILED DESCRIPTION OF THE PREFERRED EMBODIMENT

Embodiments of the present invention relate to game units, and game unit networks that transmit sounds from one game unit on the network to other game units on the network. In one embodiment, each game unit is a video game such as a car driving game. In one embodiment, a state table is stored within the car driving game that stores aspects of each player's car.

For example, on a first player's video game there may be five cars visible, with one car being driven by the first player, cars two and three being driven by other players on the network, and cars four and five being automatically generated and driven by the game unit. Each of the cars being displayed to the first player have a corresponding state table stored on the first player's game unit. The state table can be stored on a conventional hard disk or other type of computer memory, and include a plurality of bits. Each bit (or set of bits) in the state table corresponds to a particular state of a car.

For example, several bits within the car state table can describe the three-dimensional location of the car on the video display. Other state table bits are "appearance bits" and correspond to the look of the car. The look of the car can be the direction that wheels are pointing, or whether there is damage to any panel of the car. The appearance bits are discussed more completely below in relation to Table 1.

In one embodiment of the invention, there are 32 bits corresponding to the appearance of each car being raced during the game. Of course, more or less bits describing the appearance of a car in the game unit network could be used.

In one embodiment of the invention, when the first player takes an action, such as turning the steering wheel, the first game unit stores new appearance bits to the car state table. One of the bits may correspond, for example, to a changed position of the front tires. Another bit may correspond to a changed position of the rear tires.

Instructions within the first player's game unit then send the changed bits to all of the other game units involved in the current game. An identification bit (or bits) is preferably sent along with the changed state bits so that the receiving game units can identify the origin of the received bits. Thus, the second and third players will both receive new car state table bits from the first player.

Instructions within the second and third player's game units store the new bits to the car state table for the first player, thus changing the appearance of the first player's car on the video display of the second and third player's game unit. Of course, synchronizing the car state tables for each player across the wide area network is related to aspects of the invention. This synchronization provides one mechanism for allowing all of the players in the game to see the same position of their competitor's cars during the race. This mechanism and other aspects of the invention are discussed in detail below.

Definition of Terms

The following terms, as used herein, have the following meanings:

Game Unit, or Video Game Unit—Any piece of computing equipment that executes software used for entertainment purposes, including but not limited to, video game equipment or a general purpose computer running video game software.

Game—The experience of playing on a video game. A game may be a played on a single stand-alone game unit or on more than one game unit.

Multi-System Game—A game played on more than one video game unit.

State Sync. Method—A means of allowing players at multiple game units to participate in a multi-player, multi-system game. This method is further defined below.

Game State, or State—Game state refers to the value, at a given instant in time, of those parameters that control the outcome of the game. Some examples of game state parameters are, the position of objects both on and off the screen, character strength, character health, and wealth.

Value of a State—For a given state, state_n, the value of state_n defines all game parameters that effect the outcome of the game.

State Transitions—State transitions occur periodically. The new game state will be a function of the current game state and the current inputs.

State Synchronization—During game play the game state is periodically changing. The state changes typically occur 30 to 60 times per second. Multiple game units are said to have their states synchronized if the sequence of game states that occurs on each game unit are identical. It is not necessary for the state transitions to occur at the same time, nor is it necessary that all game units remain in any given state for the same amount of time.

Group—The term group will be used to refer to the subset of game units which are networked together and need to maintain state synchronization. The game units in a group are said to be participating in a multi-system game.

System—Any piece of computer equipment. This term is sometimes used herein synonymously with game unit.

Inputs—This term refers to any event caused by influences external to the game or group that may affect state transitions, or that may affect the outcome of the game. This includes but is not limited to the pressing of buttons, or the moving of a joystick or actuation of other input devices.

I. System Overview

Figure 3:
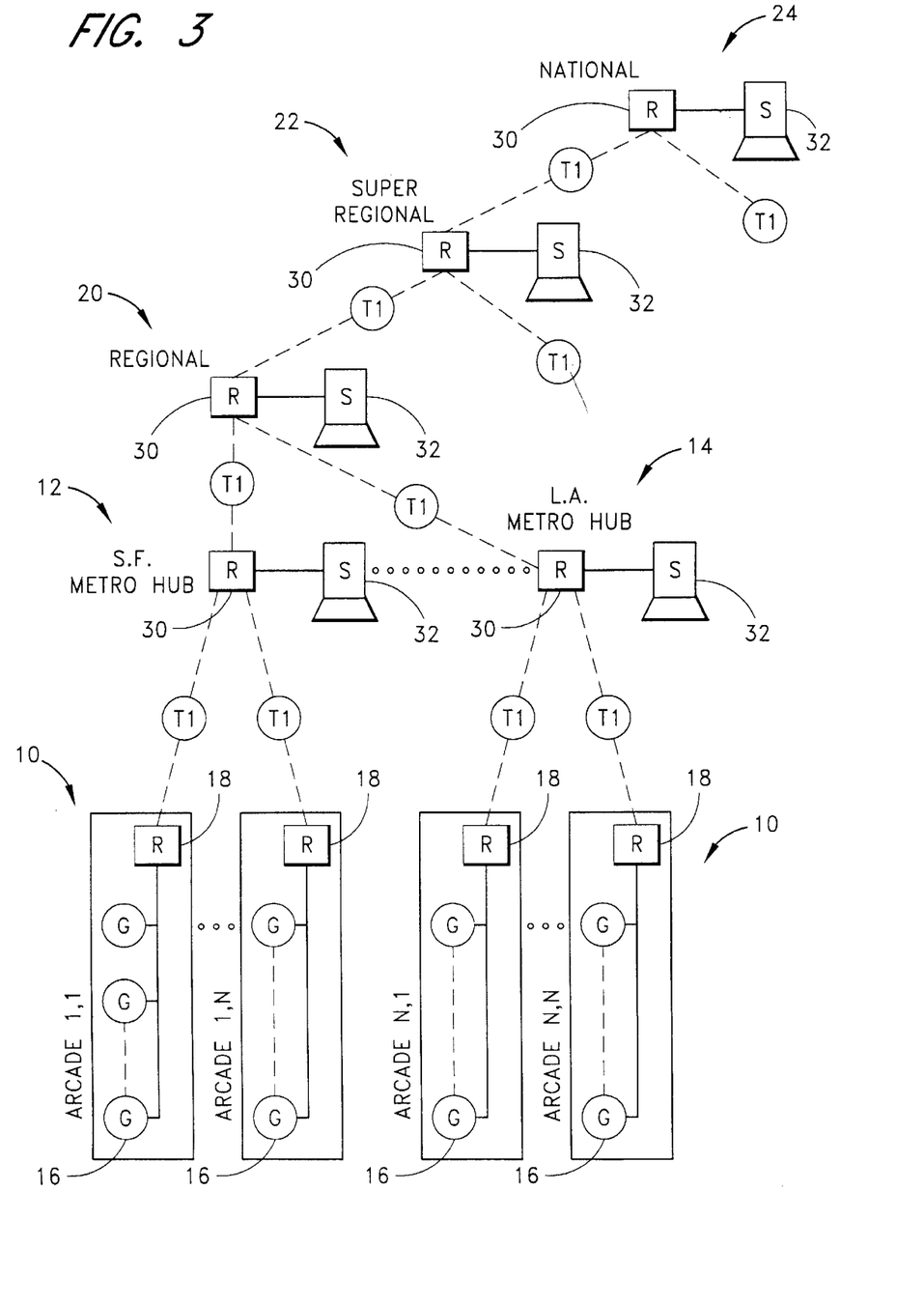
FIG. 3 is a block diagram of system for networking video games in accordance with the invention.

Referring to FIG. 3 there is shown an example of a game unit network. two or more game units 16 at different locations may be linked for real-time interactive play. These game units may include one or more video games from each of a plurality of groups of arcades 10, here designated as arcade (1, 1) through arcade (1, N) and arcade (N, 1) through arcade (N, N). In the numbering system the first number refers to the group and the second number refers to the arcade within the group. Therefore, (N, 1) refers to arcade 1 of group N. The arcades of arcade group 1 are linked, through respective communication link to a first or metro hub 12, here designated as the San Francisco (SF) hub. Similarly, the arcades 10 of group N are linked communication links to another first or metro hub, here designated as the Los Angeles (LA) hub. Suitable communication links may be a T-1 line, an ISDN line, a wireless connection, or a standard telephone line. Each arcade includes a plurality of the game units 16 which are operatively coupled with an arcade router (R) 18. Additional groups of arcades coupled to additional metro hubs may be added without departing from the invention.

A number of the metro hubs 12, 14, etc. may be coupled by communication links to a regional center 20. Similarly, one or more of such regional centers 20 may be coupled by communication links, such as T-1 lines, to a super-regional center 22 and one or more super-regional centers 22 may be coupled by T-1 lines to a national center 24.

Each metro hub 12 and each of the centers 20, 22, 24 is similar in that it includes a router (R) 30 and a server (S) 32. The servers 32 may implement bandwidth management. Generally speaking, each of the servers 32 at the metro hubs 12, 14 monitors the bandwidth usage on the T-1 lines between the metro hub 12, 14 and the various arcades 10 which are linked to that hub via these T-1 lines. This is referred to herein as downstream bandwidth management. In upstream bandwidth management, the servers 32 monitor the bandwidth usage on the T-1 line between the associated router and the next higher level as shown in FIG. 1, and control access to the respective T-1 lines. This is known as upstream bandwidth management.

Advantageously, the arrangement of routers and servers as illustrated in FIG. 3 is such that a player at an individual game unit 16 in any arcade may engage in real time interactive play with other players at other game units in other locations, whether in the same arcade or in a different arcade. These players may be in different arcades served by the same metro hub, or may be in locations which are ultimately linked by a regional, super-regional or a national center through the intervening centers and hubs. This system makes possible real time interactive play which is perceived by individual players as being substantially simultaneous play. This is done in such a maimer that, regardless of the locations of the several players, the perception of each player is essentially as if the other players were located immediately adjacent one another in the same location or arcade.

While the invention is described herein with reference to video game units in an arcade, it will be understood that the invention is applicable to game units of other types as well. For example, the network may be utilized to link home video games, whether played on stand-alone units through game controllers that link to ordinary TV sets or for games that are played on personal computers (PCs). Any of these game units, if provided with suitable hardware and software for accommodating networking operation, could be linked to the network described above with reference to FIG. 3.

Figure 4:
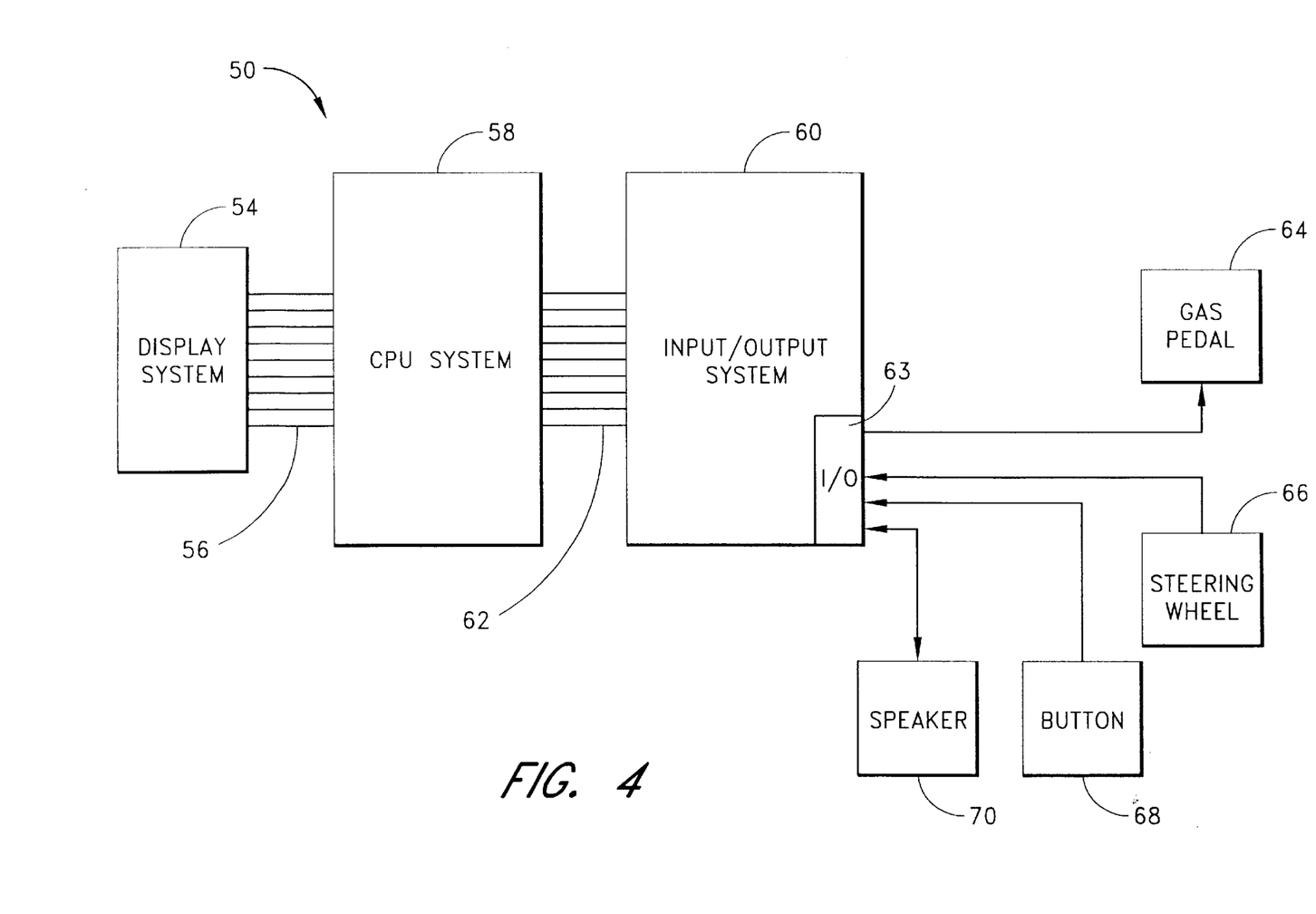
FIG. 4 is a simplified block diagram illustrating one embodiment of a video game in accordance with the invention.

FIG. 4 illustrates an example of a game unit 50 that includes several subsystems, as is known in the art. For example, conventional arcade game units include a display system 54 for displaying high resolution, three dimensional images to a screen. The display system 54 communicates through a bus 56 to a Central Processing Unit (CPU) system 58. The bus 56 can be in the form of any conventional data bus, but is preferably a peripheral component interconnect (PCI) bus as is well known in the art. The CPU system 58 includes a processor such as a Quantum Effect Design, Inc. R7000 processor or any other well-known processor such as those provided by Motorola, Hitachi, Intel or IBM. The CPU system 58 also includes an appropriate computer memory and storage for storing computer programs and data.

The CPU system 58 communicates with an input/output system 60 through a local bus 62. The local bus 62 is preferably a 32-bit local bus that provides data communications between the CPU system 58 and the input/output system 60.

Within the input/output system 60 is an I/O connector 63 that accepts inputs from peripheral devices. In one embodiment, the I/O connector 63 is a Japanese Amusement Machine Manufacturer's Association (JAMMA) connector. This type of connector is well-known in the art of arcade games and provides an interface for determining whether a peripheral event has occurred. For example, in many arcade games, a JAMMA connector is used to determine whether the start, fire, up, down, left or right buttons have been pressed by a player during a game play. Connected to the I/O connector 63 are a gas pedal 64, Steering Wheel 66, View Button 68 and Speaker 70. Thus, when action is taken by a player, inputs into the I/O connector 63 are activated.

II. State Synchronization

In general, a video game program is based on a series of state transitions. Typically these transitions are made at periodic intervals usually related to the video frame rate for that game system. Some or all of the state transitions will be dependent on input values. Multiple game units coupled via a network for a multi-system game require some method of state synchronization.

When using the state synchronization method, each game unit of the group must agree on the value of each game state as the game unit sequences from the initial state to the final state at the end of the game. Let the first state that a game unit is in when a multi-game unit game begins, be designated state_1. A game unit will act on various inputs (for example a user's button depressions and joystick movements) during state_1 and it will go into a new state, state_2. The value of an arbitrary state will be called state_n where n indicates when the state occurred in the sequence of states making up the game. The value of state_n, will be a function of value of the previous state (state_n−1) and the value of the inputs as sampled prior to state_n.

The system includes instructions for ensuring that while in any given state, each game unit in a group will allow certain state transitions to occur only when the game unit is operating on the same set of input that every other game unit in the group will operate on when in that given state.

To achieve this, each game unit in the group must transmit all necessary input data to all game units in the group, and insure that state transitions at each game are based on identical input data.

For example, suppose game unit 1 samples the following input I(1,1), I(1,2), I(1,3), I(1,4), I(1,5), where I(n,m) is the mth sample of input obtained by the nth game unit, and game unit 2 samples I(2,1), I(2,2), I(2,3), I(2,4), and I(2,5). The system insures that when any game unit in the group of x game unit operates on inputs I(1,1) it will also operate on input I(2,1), i(3,1), . . . I(x,1) for all game units in the group, and that, each game unit of the group will operate on all inputs I(1,n), I(2,n), . . . I(x,n) while in state_n. In the event that a game unit has not received all input required for a given state, the game unit must defer from making a state transition until all necessary data has been received from each game unit in the group.

The operation of certain aspects of the invention are described in connection with the following examples which describe a four player group (i.e. a four player game) with four physical game units participating. The invention is applicable to more or fewer (than four) game units, the following being but one set of examples.

Example 1 depicts a buffer that holds 4 sets of state tables representing aspects of four game units. This buffer is present on each of the four game units. We will be looking at the buffer of game unit 1 in this example.

EXAMPLE 1

|  | $4^{th}$ Inputs | $3^{rd}$ Inputs | $2^{nd}$ Inputs | $1^{st}$ Inputs |
|---|---|---|---|---|
| Game Unit 1 | | | | |
| Game Unit 2 | | | | |
| Game Unit 3 | | | | |
| Game Unit 4 | | | | |

The column labeled "$1^{st}$ Inputs" represents all inputs detected during the first time interval during which user inputs are sampled. In this context "inputs" refers to any activation of game unit elements, such as pushbuttons, joysticks, or the like by a player, or other signals generated by the game unit in response to some action taken or initiated by a player. Again, in one embodiment, the inputs are represented in a sate table for each player. "$N^{th}$ Inputs" represent all inputs detected during the $N^{th}$ time interval during which user inputs are sampled. As inputs are sampled at the local game unit (i.e., game unit 1), they are stored in the buffer, and they are also transmitted to each other game unit in the group. The state transaction functionality of the game unit requires inputs from each group unit and will not act on the inputs until there is a set of inputs available from each group unit in the group.

The following examples depict the usage of this buffering technique to keep four separate game units in state synchronization.

Game Unit 1 will obtain its first user inputs and store them into the buffer cell (Game Unit 1, 1$^{st}$ Inputs) i.e. I(1,1), as shown in Example 2. It will also transmit these inputs to each game unit in the group.

EXAMPLE 2

|             | 4$^{th}$ Inputs | 3$^{rd}$ Inputs | 2$^{nd}$ Inputs | 1$^{st}$ Inputs |
| --- | --- | --- | --- | --- |
| Game Unit 1 |   |   |   | I(1,1) |
| Game Unit 2 |   |   |   |   |
| Game Unit 3 |   |   |   |   |
| Game Unit 4 |   |   |   |   |

When Game Unit 1 obtains its second set of user inputs it will store them in cell (Game Unit 1, 2$^{nd}$ Inputs). It will also transfer these new inputs to each game unit in the group as shown in Example 3.

EXAMPLE 3

|             | 4$^{th}$ Inputs | 3$^{rd}$ Inputs | 2$^{nd}$ Inputs | 1$^{st}$ Inputs |
| --- | --- | --- | --- | --- |
| Game Unit 1 |   |   | I(1,2) | I(1,1) |
| Game Unit 2 |   |   |   |   |
| Game Unit 3 |   |   |   |   |
| Game Unit 4 |   |   |   |   |

When Game Unit 1 starts receiving the user inputs from other game units in the group it will store them in the appropriate cells of the buffer. For example when Game Unit 1 receives Game Unit 3's 1$^{st}$ inputs the buffer will be as represented by Example 4.

EXAMPLE 4

|             | 4$^{th}$ Inputs | 3$^{rd}$ Inputs | 2$^{nd}$ Inputs | 1$^{st}$ Inputs |
| --- | --- | --- | --- | --- |
| Game Unit 1 |   |   | I(1,2) | I(1,1) |
| Game Unit 2 |   |   |   |   |
| Game Unit 3 |   |   |   | I(3,1) |
| Game Unit 4 |   |   |   |   |

After Game Unit 1 has sampled its 3$^{rd}$ set of inputs and subsequently received its first set of inputs from Game Unit 2, and the second set of inputs from Game Unit 3 the buffer will be as represented by Example 5.

EXAMPLE 5

|             | 4$^{th}$ Inputs | 3$^{rd}$ Inputs | 2$^{nd}$ Inputs | 1$^{st}$ Inputs |
| --- | --- | --- | --- | --- |
| Game Unit 1 |   | I(1,3) | I(1,2) | I(1,1) |
| Game Unit 2 |   |   |   | I(2,1) |
| Game Unit 3 |   |   | I(3,2) | I(3,1) |
| Game Unit 4 |   |   |   |   |

Up to this point none of the inputs have been operated on in any way that will affect the state of any portion of the program with the exception of the state of the buffer itself. Once the last set of user inputs arrive the program can operate on all the inputs I(x,1). The buffer will temporarily be as shown in Example 6.

EXAMPLE 6

|             | 4$^{th}$ Inputs | 3$^{rd}$ Inputs | 2$^{nd}$ Inputs | 1$^{st}$ Inputs |
| --- | --- | --- | --- | --- |
| Game Unit 1 |   | I(1,3) | I(1,2) | I(1,1) |
| Game Unit 2 |   |   |   | I(2,1) |
| Game Unit 3 |   |   | I(3,2) | I(3,1) |
| Game Unit 4 |   |   |   | I(4,1) |

Game Unit 1 may now act upon the first set of inputs (1$^{st}$ Inputs) together. These inputs are then discarded from the buffer and the 2$^{nd}$ set of inputs are now next to be operated on. Similarly, each other game units in the group will act upon the 1$^{st}$ set of inputs once it has received all first inputs from all game units in the group.

After Game Unit 1 operates on the first inputs the buffer will be as shown in Example 7.

EXAMPLE 7

|             | 5$^{th}$ Inputs | 4$^{th}$ Inputs | 3$^{rd}$ Inputs | 2$^{nd}$ Inputs |
| --- | --- | --- | --- | --- |
| Game Unit 1 |   |   | I(1,3) | I(1,2) |
| Game Unit 2 |   |   |   |   |
| Game Unit 3 |   |   |   | I(3,2) |
| Game Unit 4 |   |   |   |   |

Game Unit 1 will not continue operating on user input until it receives all the second input data from all game units.

Use of this method insures that each state transition occurring in each game unit will use the same set of inputs to transition from the old state to the new state. This ensures that the value of the new state, after the transition, will be identical on each game unit.

Note that it is not necessary that each game unit operate on the input data at the same time, only that each game unit operate on the same sequence of input data.

Summarizing the above, let us call the initial state of any game unit software state__1, where state__1 is the state of the game unit just before the game unit operates on any user input. Further, if we call the state that a game unit is in after is operates on input i(x,1) state__2, then to stay in synchronization:

1. When in state n every game unit in the group must receive input I(x,n) from all game units i.e. for all valid values of x.
2. Each game unit must operate on the full set of inputs I(x,n) before going to state__n+1.

Briefly, in operation, the state synchronization method described above means that each player linked to a game unit in a multi-player game or multi-system game as defined above will be aware of any action taken (or no action taken if such is the case) by each and every other player, at each state of the game.

In the exemplary embodiment, the game states transition at a 60 hertz rate, that is 60 times per second which is also the typical frame rate of the video in each game unit linked in such a system. Thus, for example, if one or more players is "slower" and takes no action through a number of states, this lack of action comprises the "input" which is delivered to all of the other game units linked in a particular group. If, on the other hand, the input (that is, the activities or actions)

of one player are delayed due to some delay in the network, on communication links connecting various parts of the network, or the like, the lack of an input from one or more players corresponding to a given state will cause the other game units to also delay transition to the next state until all of the inputs have been received.

This is in contrast, for example, to a single or standalone game unit wherein the game controller analyzes all of the player input and determines the next state. Here, the next state cannot be fully determined until the input from all of the players in the group of game units have been received. In the embodiment illustrated, the software for carrying out the state synchronization method is resident in the CPU or other central control unit of each individual game unit. That is, each game unit to be linked by the network of the invention is equipped with appropriate networking hardware and software both for linking through the routers 18 to the network and for carrying out the state sync method as described above.

III. Remote Activation of Video Game Sounds

Figure 5:
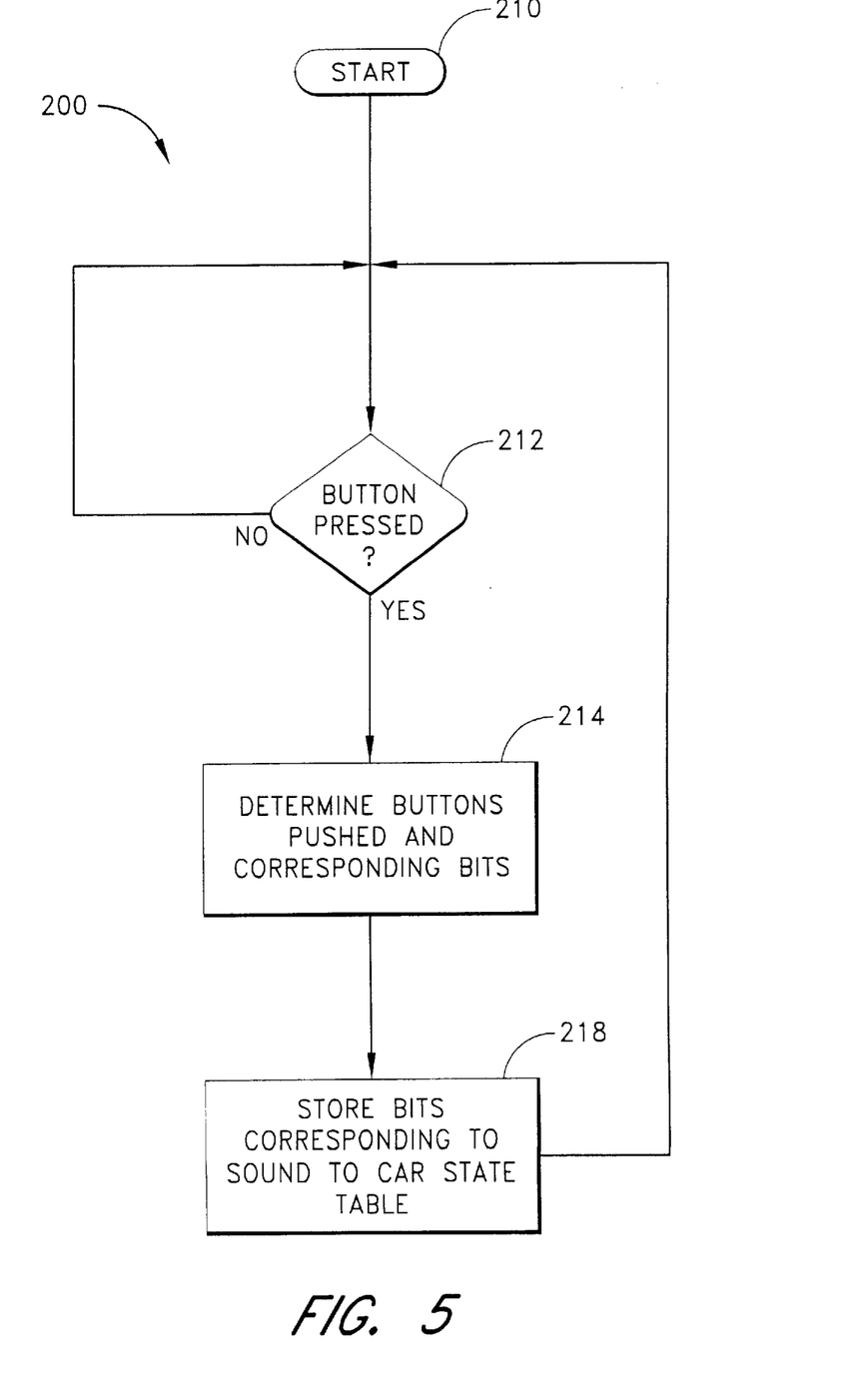
FIG. 5 is a flow diagram of a process of sending and storing sounds to a state table.
Figure 6:
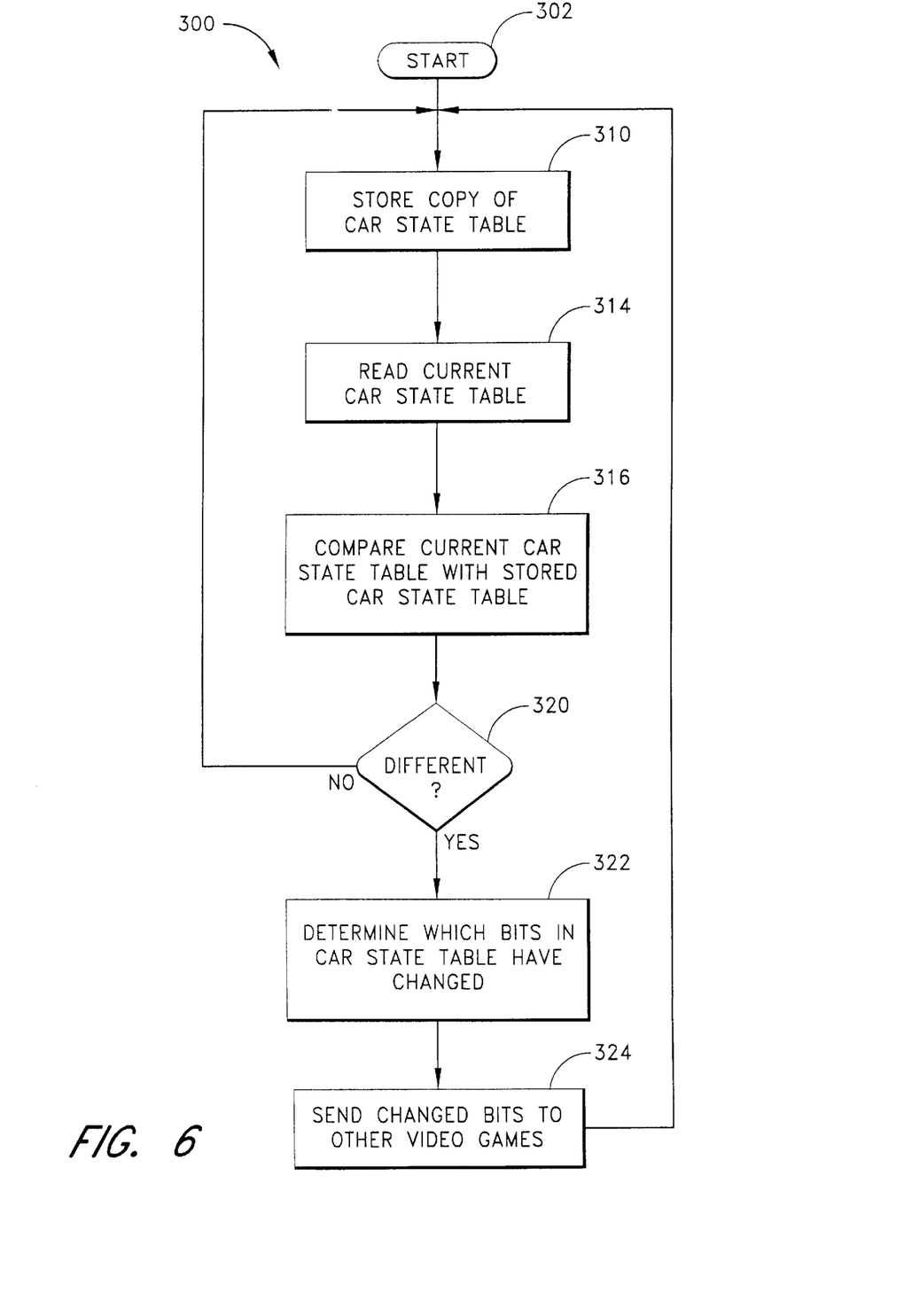
FIG. 6 is a flow diagram of a process of sending sound bits to remote video units.
Figure 7:
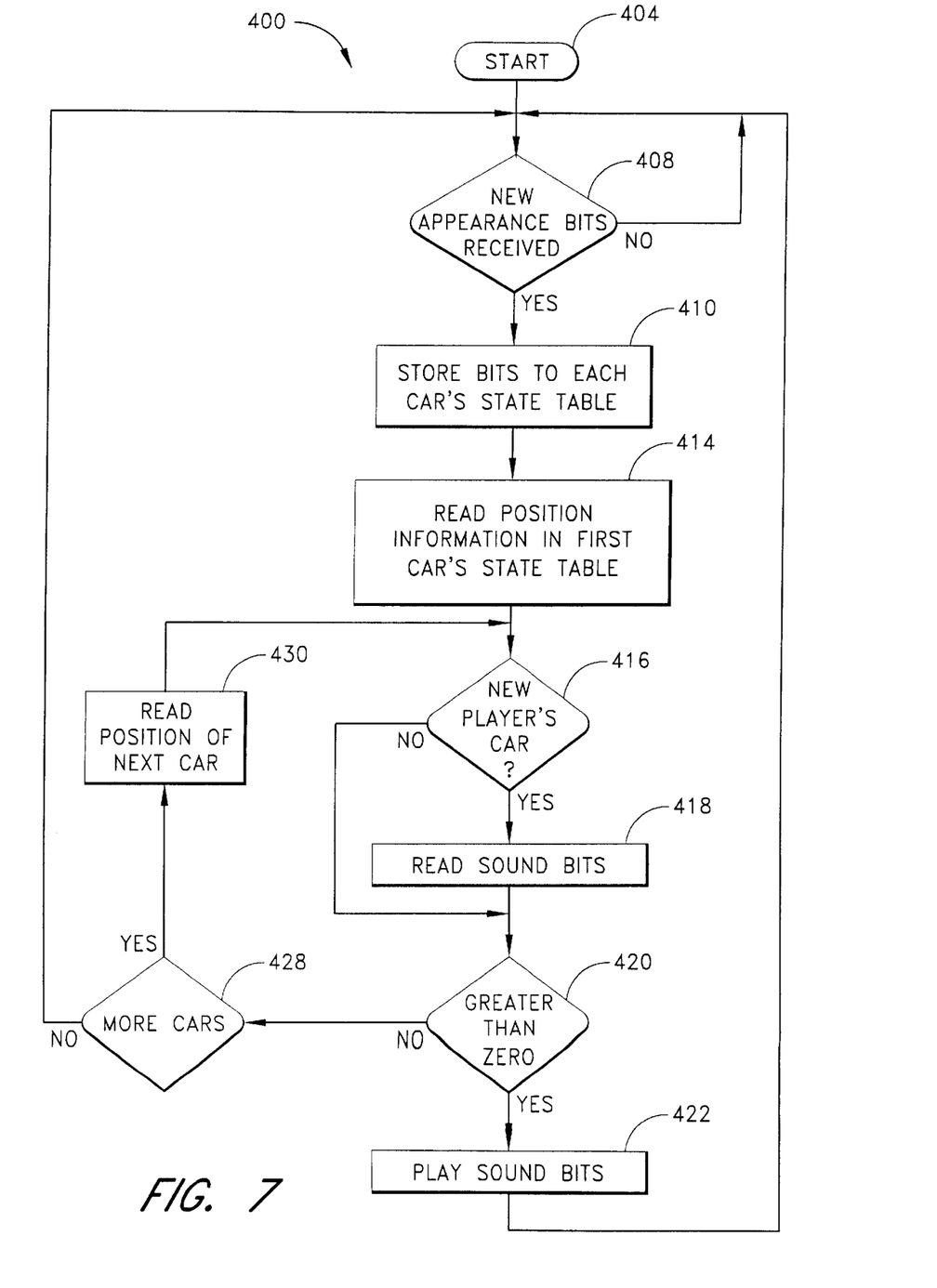
FIG. 7 is a flow diagram of a method of receiving and playing sounds.

FIGS. 5, 6 and 7 represent processes or methods which relate to the remote activation of video game sounds across a network, such as was described above. Each game unit on the network runs the methods. As was mentioned above, each of the processes depicted in FIGS. 5, 6 and 7 can be implemented by software running on the CPU of a game unit. Referring now to FIG. 5, a process 200 of storing sound bits (sound bits are one example of appearance bits) to a state table is illustrated. The process 200 begins at a start state 210. Next at decision state 212 the game unit determines whether the current player has pressed any button on their video game. Such determination can be made using techniques known to those of skill in the art such as scanning used on typical computer input devices. If no buttons have been pressed, the process 200 continues "looping" (repeating the determination represented by decision state 212) until a button has been pressed. Once a determination is made that a button has been pressed at the decision state 212, the process 200 moves to a state 214 wherein the system analyzes the button, or buttons pressed.

The process determines the proper bits to store to the state table according to which button or buttons were pressed. The process 200 then moves to the state 218 wherein the bits determined at state 214 are stored to the player's car state table. The process 200 then returns to the decision state 212 to await for another button of the video game to be pressed.

As shown in Table 2, different video game sounds can be generated by pressing various buttons on the video game. For example, the combination of pressing the view button and the start button correspond to sound of "look out" represented as the bits 0,0,1 and by pressing just the view button the system generates the sound "get out of my way" represented by the bits 0,1,0. Depending on which buttons are simultaneously pressed, the system will set various sound bits in the car state table being driven by the player. Examples of several sound bits and their corresponding sounds are illustrated below in Table 1.

TABLE 1

Description of Sound Bits

| Sound Bits | Description |
| --- | --- |
| 0,0,0 | No sound |
| 0,0,1 | "Look out" |
| 0,1,0 | "Get out of my way" |
| 0,1,1 | "Move aside" |
| 1,0,0 | "Beep" |

Referring now to FIG. 6, a process 300 of sending sound bits, such as those stored by the process depicted in FIG. 5, to remote game units on a video game network is illustrated. The process 300 begins at a start state 302 and then moves to a state 310 wherein a copy of the player's car state table is generated and stored on the current video game.

The process 300 moves to a state 314 wherein the video game reads the current car state table. A comparison is then made between the current car state table and the stored car state table at a state 316. The process 300 then moves to a decision state 320 wherein a determination is made whether the current car state table and the stored car state table are different. The current and stored car state tables will be different when, for example, the player has taken an action such as passing a horn button which causes the car state table to be updated.

If there is no difference between the current car state table and the stored car state table, the process 300 returns to the state 314. However, if there is a difference between the current car state table and the stored car state table, the process 300 moves to a state 322 wherein a determination is made of which bits in the car state table have changed.

Once a determination has been made of which bits have changed in the car state table, the process 300 moves to a state 324 wherein the changed bits are transmitted to the other game units on the video game network. The process 300 then returns to the state 310 and stores a copy of the car state table.

Thus, the process 300 disclosed in FIG. 6 illustrates a mechanism for determining which bits have changed in a car state table and thereafter sending those changed bits to other game units on the video game network. It should be noted that each game unit can be provided with a unique identification number than can be transmitted along with the changed state bits so that the receiving game units can identify the originating game unit.

Referring to FIG. 7, a method 400 of receiving and playing sounds on a video game is illustrated. Though this example is directed to sound bits, it also applies to other appearance bits. The process 400 begins at a start state 404 and then moves to a decision state 408 wherein a determination is made whether any new appearance bits, such as sound bits, have been received. If no new appearance bits have been received at the decision state 408 the process 400 continues looping until some appearance bits have been received. Once any new appearance bits have been received at the decision state 408, the process 400 moves to a state 410 wherein the received appearance bits are stored to the appropriate cars state table. As discussed above, each car, or other indicia representing the player, has a state table that stores the appearance bits for that indicia. For example, in one embodiment, the indicia is a video representation of a car. Thus, the appearance bits represent the position, look and other attributes of the car. The following table illustrates several examples of appearance states for a video representation of a car. Each appearance state is shown on a car by changing bits within the car's state table. For example, showing smoke from the car, as indicated by the App_M_Smoke field, is undertaken by changing several bits in the car state table.

Indicating that a horn sound should be played on a car is undertaken by pressing a VIEW button on the game unit, thus changing the sound bits to correspond, for example, with the App_M_HORN1A field.

TABLE 2

Appearance States Within the Car State Table

| FIELD | HEX | Description |
|---|---|---|
| App_M_HORN | 0x00300001 | Horn mask |
| App_M_HORN1 | 0x00100000 | View1 switch - hit button for first time |
| App_M_HORN1A | 0x00100001 | View1 alt - hit while in View 1 |
| App_M_HORN2 | 0x00200000 | View2 switch |
| App_M_HORN2A | 0x00200001 | View2 alt |
| App_M_HORN3 | 0x00300000 | View3 switch |
| App_M_HORN3A | 0x00300001 | View3 alt |
| App_M_DAMAGE | 0x00000018 | Generic damage. (used for hulk and translucency) |
| App_M_SMOKE | 0x00000060 | Engine smoke. |
| App_M_TRAILS | 0x00000180 | Trailing effects. (Used for L&R sparks) |
| App_M_HATCH | 0x00000C00 | Hatch. (Used for bottom sparks) |
| App_M_LIGHTS | 0x00007000 | Any Lights. (high bit unused) |
| App_M_HEAD_LIGHTS | 0x00002000 | Head lights. (unused) |
| App_M_BRAKE_LIGHTS | 0x00001000 | Brake lights. |
| App_M_FLAMES | 0x00008000 | Flames rising from entity. (currently unused) |
| App_M_FROZEN | 0x00200000 | Entity is frozen. (currently unused) |
| App_M_DEACTIVATED | 0x00400000 | Entity is deactivated. (modifed from DIS value) |

The following fields are also defined for certain specific types of entities.
Car Entities.

| FIELD | HEX | Description |
|---|---|---|
| App_M_ANY_DAMAGE | 0xFFC00000 | Any damage to car. |
| App_M_LF_DAMAGE | 0xC0000000 | 4 levels, left-front. |
| App_M_RF_DAMAGE | 0x30000000 | 4 levels, right-front. |
| App_M_LR_DAMAGE | 0x0C000000 | 4 levels, left-rear. |
| App_M_RR_DAMAGE | 0x03000000 | 4 levels, right-rear. |
| App_M_TOP_DAMAGE | 0x00C00000 | 4 levels, top. |
| App_M_TIRE_SMOKE | 0x000F0000 | Any Tire Smoke. |
| App_M_LF_SMOKE | 0x00080000 | Left Front Smoke. |
| App_M_RF_SMOKE | 0x00040000 | Right Front Smoke. |
| App_M_LR_SMOKE | 0x00020000 | Left Rear Smoke |
| App_M_RR_SMOKE | 0x00010000 | Right Rear Tire Smoke. |
| App_M_SKID_MARK | 0x00000606 | Any Tire leaving skid marks. |
| App_M_LF_SKID | 0x00000002 | Left Front Skid. |
| App_M_RF_SKID | 0x00000004 | Right Front Skid. |
| App_M_LR_SKID | 0x00000200 | Left Rear Skid |
| App_M_RR_SKID | 0x00000400 | Right Rear Tire Skid. |
| App_M_SPARKS | 0x00000980 | Any spark. |
| App_M_LSPARK | 0x00000100 | Left side sparks. |
| App_M_RSPARK | 0x00000080 | Right side sparks. |
| App_M_BSPARK | 0x00000800 | Bottom sparks. |
| App_M_HULK | 0x00000010 | Car is a hulk. |
| App_M_TRANSLUCENT | 0x00000008 | Car is translucent. |
| App_M_UNUSED | 0x0000E000 | bits not currently in use. |

Because every frame in the video game may include several cars, the game units store each car's appearance in a separate state table. Once the appearance bits for each car's state table have been stored at the state 410, the process 400 moves to a state 414 wherein the process 400 reads the three dimensional positional information from a first car's state table. A determination is then made at the decision state 416 whether the first car's three dimensional position is near the player's car. As discussed above, there may be several cars shown on the video display corresponding to all of the different players within the wide area video game system. Thus, at the decision state 416, a determination is made whether the first car chosen is located "near" the location of the car being driven by the current player of the game unit. In this manner, the system can determine whether the players car is geographically near any other car driven by a different player within the video game system. The term "near" is used to indicate the distance relationships between vehicles represented in the video game. The exact definition (e.g., 200 yards) can be set or chosen according to the decision of the game manufacturer or the player.

If a determination is made at the decision state 416 that the first car's three dimensional position is near the player's car, the process 400 moves to a state 418 wherein the sound bits are read from the first car's state table. Once the sound bits are read at the state 418, a decision is made whether they are greater than zero at a decision state 420. If the sound bits are set to zero, then the player driving the first car has not pressed a horn or sound button.

If a determination was made at the decision state 420 that the sound bits were greater than zero, then the process 400 moves to a state 422 wherein the sound represented by the sound bits is played through the speaker of the current game unit. The process 400 then returns to the decision state 408 to wait for new appearance bits to be received.

However, if a determination is made at the decision state 416 that the first car was not located near the players car then the process 400 moves to a decision state 428 to determine whether more cars are available on the video display to be analyzed. If a determination is made that no more cars are visible, the process 400 returns to the decision state 408 to determine whether any new appearance bits have been received. However, if more cars are available on the video display to be analyzed, the process 400 moves to a state 430 wherein the geographical three dimensional position of the next car on the display is read. The process 400 then returns to the decision state 416 to determine whether the current car being read is located near the position of player's car.

To summarize, the process 400 receives new appearance bits from other video games on the video game network and determines if any car is located near the player's car on a three dimensional coordinate system. This is done to ensure that only cars shown as close to the player's car can use their horn to play noises on the current player's game unit. If the player's car is near another car, a determination is made whether the sound bits in the state table for that car indicate that the horn button has been pressed. If the horn button has been pressed, the current player's video game will play the sound corresponding to the sound bits stored in the state table.

IV. Displaying Names

Figure 8:
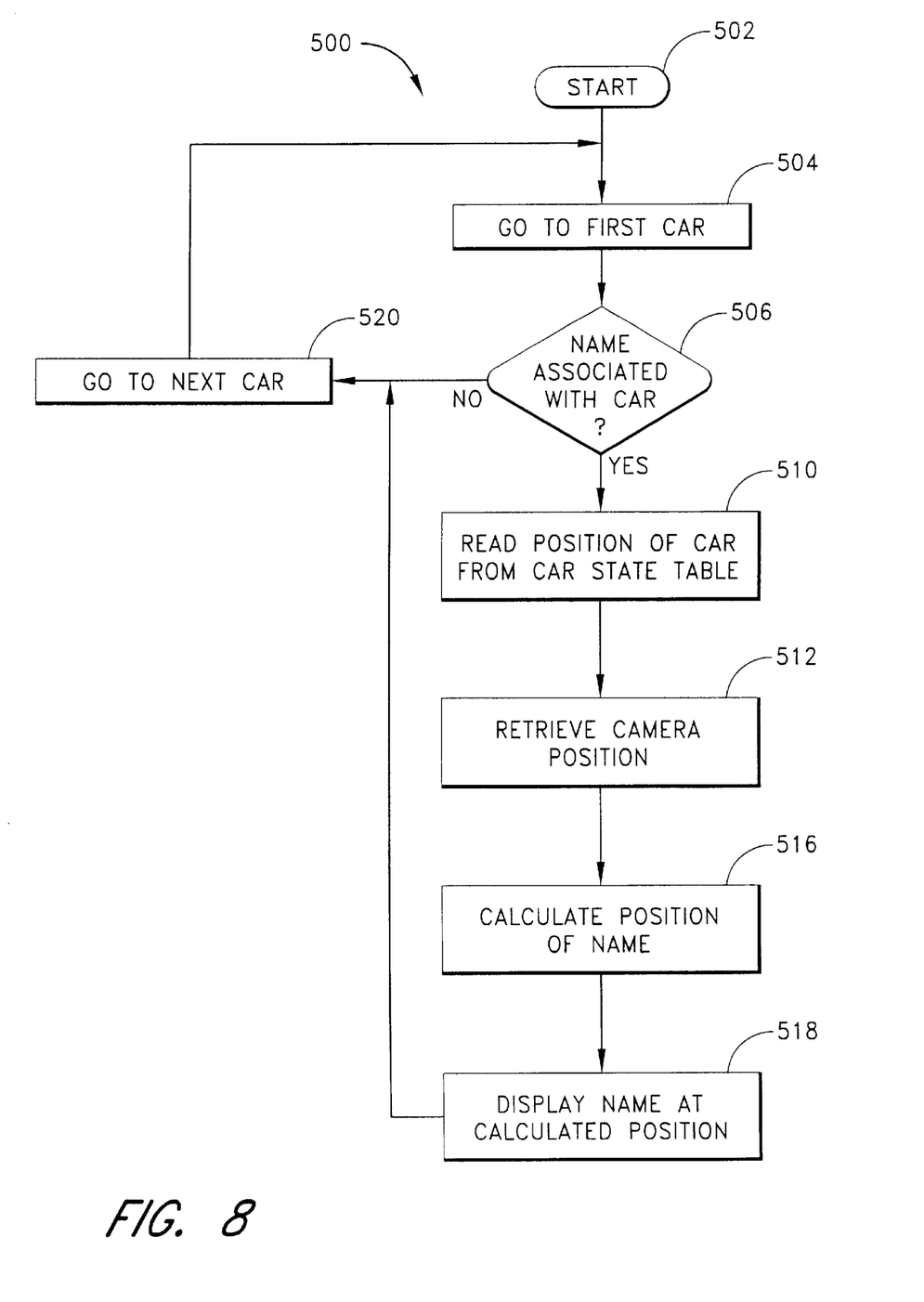
FIG. 8 is a flow diagram of a method of displaying names next to cars in a video game.

Referring now to FIG. 8, a process 500 of displaying names or identifiers corresponding to players near their cars is discussed. This process can be implemented by software running on the CPU of a game unit. It should be noted, however, that this invention is not limited to only vehicle driving video games. Other games, for example, such as golf games, combat games and fighting games are contemplated wherein the name of the player (or other usual indicia)is displayed next to the video representation, for example, of a golfer corresponding to him. Advantageously, the system of the present invention displays the name of the player near the video representation corresponding to his car or player as the video representation moves on the video display screen. In one embodiment, the name is displayed in a fixed font so that as the video representation of the car or golfer shrinks or expands in size as a function of distance, the size of the name is displayed in a consistent size.

The process 500 of displaying a name begins at a start state 502 and then moves to a state 504 wherein the first car in a car driving game is identified. The process 500 then moves to a decision state 506 wherein a determination is made whether the currently identified car has a player's name associated with it. As is known, some cars may not have an associated name if the player has not entered a name into the video game. In addition, some cars are provided by the game itself and are not linked to any particular player. If there is a name associated with the selected car, the process 500 moves to a state 510 wherein the position of the car on the screen is read from the car state table. As discussed above, the car state table includes bits describing the three-dimensional position of the car within the video display.

Once the three-dimensional position of the car has been read at the state 510, the process 500 moves to a state 512 wherein the camera position selected by the player is read. For example, the camera position or view is selected by pressing a view button on the game unit which cycles through several different possible views. For example, one camera position may be a view from inside the current player's race car. An additional camera position may be a view from above the current player's car. Of course, other views are contemplated and are within the scope of the present invention.

Once the camera position has been determined at the state 512, the process 500 moves to a state 516 wherein the position of the name is calculated so that it appears next to the car identified at state 504. As can be envisioned, the position of the name would change depending on the view selected by the current player and the position of the current player's car within the video game. For example, if the view was from a camera position within the car, the name would be displayed so that it could be read through the windshield of the car. However, if the view corresponded to a camera position floating above the car, the name could be presented almost anywhere on the screen and still be easily read by the player of the current video game.

It should be noted that the car state table stores the absolute position of each car. Thus, in order to identify the proper position for the name, instructions within the game unit analyze the position of each car in relation to the current player's car. Thus, the presentation of each player's name will change depending on the position of the current player's car.

In determining the proper position for the name, the instructions analyze several variables. For example, if the selected view is from above the car. The player's name can be shown floating for above the car. However, if the selected view is from inside the car, the instructions determine the most logical position of each name. For example, if a name is about to overlap with another name because two cars are very near each other, the instructions can print the names to the left or right of each car.

In addition, in one embodiment, when the cars are displayed very far in the distance the name displayed can turn into an arrow or other graphical indicator. Because an arrow can be generated with a smaller width than a name, more car indicators can be distinguished from one another as they are in the distance. Of course, when any car moves from the distance to a point closer to the current player's car, the arrow or other indicia can change back into a name.

The process 500 then moves to a state 518 wherein the name associated with the currently selected car is displayed at the calculated position. As discussed above, the name can be displayed in a fixed font, such as in an 8-pixel by 8-pixel fixed font. Of course, other sized fonts are contemplated to be within the scope of the present invention. Once the name of the player has been displayed above that player's car the process 500 moves to a state 520 wherein the system begins analyzing the next car displayed on the screen. A determination is then made whether a name has been associated with that car at the decision state 506.

What is claimed is:

1. A system for remotely activating a sound in a game unit having a processor and a memory for storing sound bits, wherein the game unit is linked to other game units, comprising:

one or more sound bits, wherein the sound bits are set by a player action;

instructions for sending the one or more sound bits across a video game network to a remote video game;

a state table in the remote video game for storing the sound bits; and commands in the remote video game for reading the sound bits and activating a sound.

2. The system of claim 1, wherein the sound bits comprise three bits.

3. The system of claim 1, wherein the remote video game is a car driving game and comprises indicia of cars.

4. The system of claim 1, wherein the state table comprises 32 appearance bits.

5. The system of claim 3, wherein the remote video game comprises instructions for playing the sound bits when the indicia of cars are within a predetermined distance from each other in the car driving game.

6. The system of claim 1, wherein the remote video game comprises a table that correlates the one or more sound bits with spoken words.

7. A video game unit comprising:

indicia of cars, wherein each indicia is linked to one or more data bits corresponding to sounds;

first instructions for determining whether one or more data bits have been set for a first indicia of a car; and second instructions, responsive to the one or more data bits being set, wherein the instructions calculate the distance of the first indicia of a car from a second indicia of a car within the video game, and wherein the second instructions result in a sound corresponding to the one or more data bits being generated if the first indicia of a car is within a predetermined distance from the second indicia of a car.

8. The video game unit of claim 7, wherein the one or more data bits are three data bits.

9. The video game unit of claim 7, wherein the distance between the first indicia of a car and the second indicia of a car is calculated from positional information stored in a state table for each indicia.

10. A method for generating sounds on a game unit in a game unit network, comprising:

receiving sound bits from a first game unit on a game unit network, wherein the sound bits correspond to a first indicia of a car being driven by a first player;

reading first positional information for the first indicia of a car;

reading second positional information for a second indicia of a car being driven by a second player;

comparing the first positional information and the second positional information; and playing a sound corresponding to the received sound bits if the first positional information indicates that the first indicia of a car is near the second indicia of a car.

11. The method of claim 10, wherein the sound corresponds to spoken words.

12. The method of claim 10, wherein the sound bits are stored in a state table.

13. The method of claim 10, wherein the first and second positional information is stored in a state table.

14. A system for generating sounds on a game unit in a game unit network, comprising:

means for receiving sound bits from a first game unit on a game unit network, wherein the sound bits correspond to a first indicia of a car being driven by a first player;

means for reading first positional information for the first indicia of a car;

means for reading second positional information for a second indicia of a car being driven by a second player;

means for comparing the first positional information and the second positional information; and means for playing a sound corresponding to the received sound bits if the first positional information indicates that the first indicia of a car is near the second indicia of a car.

15. The system of claim 14, wherein the means for receiving the sound bits comprises a computer memory.

16. The system of claim 15, wherein the computer memory comprises a state table.

17. The system of claim 14, wherein the means for reading the first positional information comprises instructions that determine the three dimensional coordinates of the first indicia.

18. The system of claim 14, wherein the means for reading the second positional information comprises instructions that determine the three dimensional coordinates of the second indicia.

\* \* \* \* \*